UNITED STATES PATENT OFFICE.

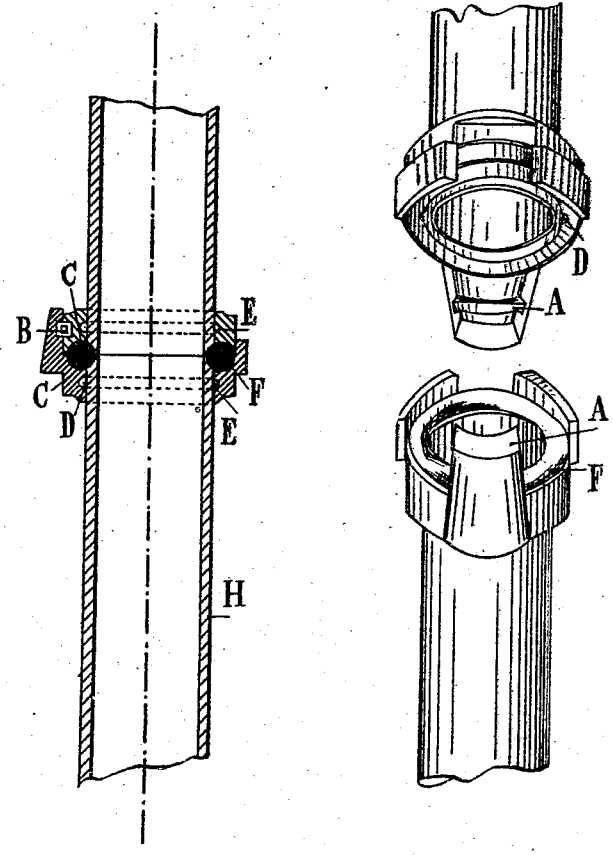

CLAUDE REVAILLOT, OF NICE, FRANCE.

PIPE-JOINT.

944,503.  Specification of Letters Patent.  Patented Dec. 28, 1909.

Application filed March 6, 1909. Serial No. 481,682.

*To all whom it may concern:*

Be it known that I, CLAUDE REVAILLOT, a citizen of the Republic of France, and resident of Nice, in France, have invented new and useful Improvements in Pipe-Joints, of which the following is a description.

The present invention relates to pipe joints and has for its object to provide a joint device capable of being applied to pipes of any size and made of any metals or cement concrete with iron structure. This improved joint is made of two main parts of similar shape which may be integral with the pipe as usual.

In the annexed drawing Figure 1 is a longitudinal section through the axis of one of the tightening lugs A—A showing the joint in the connected position. Fig. 2 is a perspective view showing the parts ready to be connected.

In Fig. 2 are shown the three connecting lugs the one of which is made longer and narrower than the others and is provided at its upper end with a V-shaped recess for the wedges B designed for tightening the joint. Each part is provided with two circular grooves, the one C of which is arranged at the upper part and forms with the notch in the pipe a recess for the india rubber ring F for insuring a tight joint, while the other D in the inner face is designed to receive both studs E on each pipe. The studs are inserted in this recess through two lateral apertures. The studs being opposite both of these apertures the parts are held on the pipe by turning the same a quarter of a revolution from the right to the left, the studs then being engaged within the groove. On each part and diametrically opposite the longer lug is a flat part, where the longer lug of other similar part is located, such flattened part being necessary for holding the wedge.

When both ends of pipes are provided with a connecting part, the parts are engaged into each other, taking care that lugs be lodged within their recesses, the longer lugs adjusted opposite the flattened parts of the corresponding members. These longer lugs must be arranged right and left on the pipe and the wider side of the V-shaped recess should be on top so as to allow the wedges B to be easily engaged and driven through. Such a joint has greatest strength.

With such removable parts, one or more lengths of pipe may be removed without interfering with the adjacent ones. This is carried out by turning the core formed of both connected parts until the studs come opposite the lateral grooves, then the wedges being removed each part may be caused to slide on the pipe, that carries the same, when the pipes will thus be disengaged and can be easily removed. For large diameters the india rubber ring may be replaced by a cement or like cord.

The advantages of this improved joint are, great rapidity of connecting and disconnecting the joint, even after a long stay in the earth and the convenience in removing one or more pipe lengths without interfering with the adjacent pipes, a matter, which is impossible in the threaded joints and in other joints which can only be disconnected by breaking the same. The cost of such a joint is very low compared with other types.

What is claimed as new is:

1. A pipe joint or coupling comprising two parts, each with connecting lugs. one of which is longer and narrower than the other and provided near its end with a V-shaped recess, and wedges engageable in said recesses for tightening the joint.

2. A pipe joint or coupling comprising two parts, each with connecting lugs, one of which is longer and narrower than the other and provided near its end with a V-shaped recess, and wedges engageable in said recesses for tightening the joint. each part provided with two separated grooves, a ring in one groove and studs in the other.

3. A pipe joint or coupling comprising two parts, each with connecting lugs, one of which is longer and narrower than the other and provided near its end with a V-shaped recess, and wedges engageable in said recesses for tightening the joint, each part provided with two separated grooves, a ring in one groove and studs in the other, each part diametrically opposite the larger lug being provided with a flattened part for engagement with said wedges.

In testimony whereof I affix my signature.

CLAUDE REVAILLOT.

In the presence of—
  H. C. COXE,
  GEORGE RIGOT.